Dec. 7, 1926.                                                    1,609,857
G. BLUEMEL
VARIABLE SPEED TRANSMISSION
Filed April 29, 1924        2 Sheets-Sheet 1

INVENTOR
GUSTAVE BLUEMEL
BY
ATTORNEYS

Dec. 7, 1926. 1,609,857
G. BLUEMEL
VARIABLE SPEED TRANSMISSION
Filed April 29, 1924  2 Sheets-Sheet 2
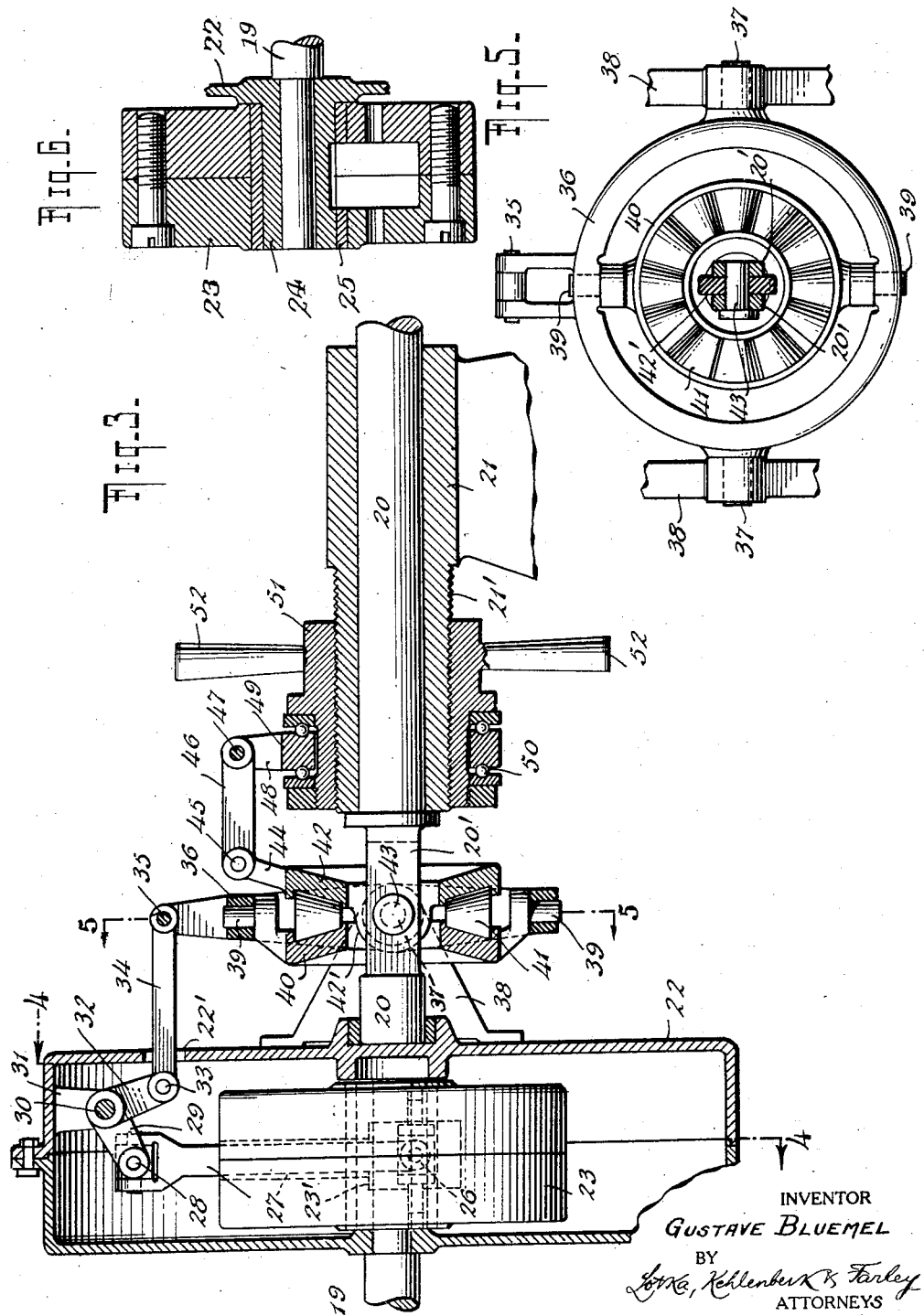
INVENTOR
GUSTAVE BLUEMEL
BY
ATTORNEYS Patented Dec. 7, 1926.

1,609,857

UNITED STATES PATENT OFFICE.

GUSTAVE BLUEMEL, OF JERSEY CITY, NEW JERSEY.

VARIABLE-SPEED TRANSMISSION.

Application filed April 29, 1924. Serial No. 709,728.

My invention relates to devices for transmitting power at a variable rate of speed from a shaft or other driving member to a driven element. The object of my invention is to provide a simple, compact and efficient mechanism for transmitting power at a rate of speed that may be varied gradually, through a practically infinite number of speed ratios, and with the valuable advantage that the torque is greatest when the speed of the driven member is lowest. The new drive has the advantages of the variable friction drive and of the hydraulic type of variable speed gear, without the drawbacks of either. In my invention, the transmission of power is effected by means of a special connection including a member to which an uneven motion is imparted, that is, a motion in which the equilibrium of the motion of said moving member is disturbed by a periodical acceleration and retardation, according to a principle which will be explained first with the aid of diagrammatic views, and then in connection with two examples of constructions embodying this invention.

Figure 1:
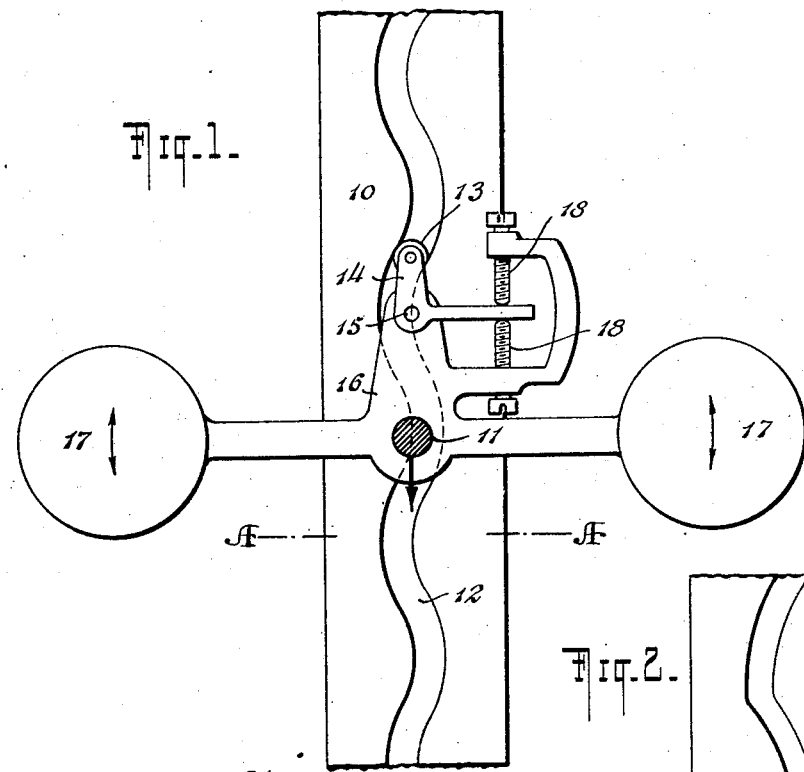
Figure 2:
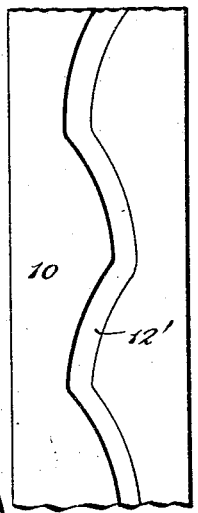
Figure 4:
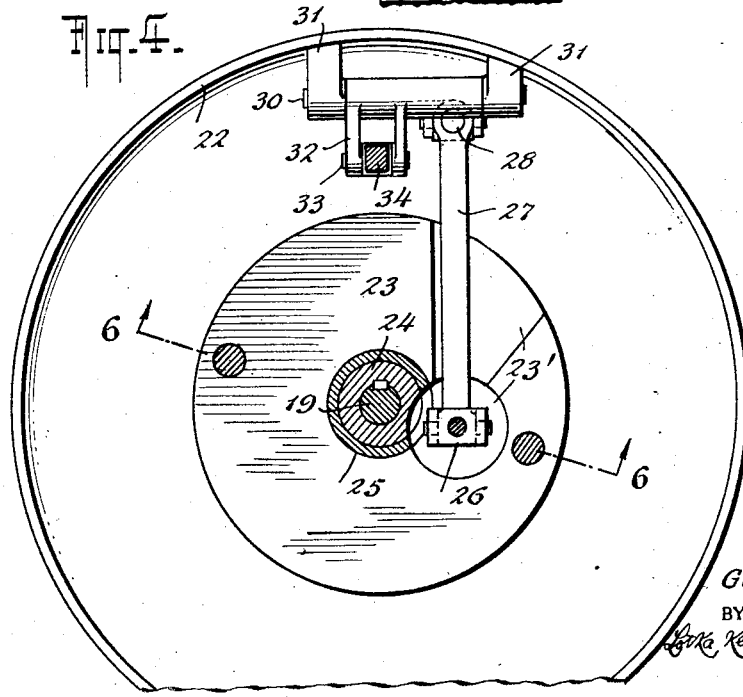

Reference is to be had to the accompanying drawings, in which Fig. 1 is a diagram illustrating, by a developed view, the principle on which my invention operates; Fig. 2 is a partial detail view illustrating a different form of cam that may be employed; Fig. 3 is an axial section showing one example of an actual embodiment of my invention; Figs. 4 and 5 are cross sections substantially on line 4—4 and 5—5 of Fig. 3, certain parts being omitted; Fig. 6 is a section substantially on line 6—6 of Fig. 4.

In the diagram Fig. 1, 10 may be taken as representing, in developed view, a portion of the periphery of a pulley or other rotary driven member the axis of which may be, for instance, at A. The driving member, indicated at 11, may be a pin carried by a suitable support (not shown) which support rotates about the same axis as the driven member 10. The arrow adjacent to 11 indicates the direction in which the driving member is assumed to be moving. The driven member 10 has a wavy groove 12 in its periphery, and into said groove fits a pin or roller 13 on one arm of a lever 14 mounted to rock about an axis 15, the fulcrum of said lever being on a member 16 which is mounted to rock about the axis of 11, the latter axis being parallel to the fulcrum axis 15. The member 11 is secured or mounted so as to compel it to move in a circular path around the axis A. The member 16 is shown provided with balanced weights 17 at opposite sides of its fulcrum 11, and also with screws or other stops 18, adjustable toward and from each other, and adapted for engagement with the other arm of the lever 14. When both screws engage the lever at the same time, as shown, the lever is locked to the member 16, and both are compelled to rock in unison on the fulcrum 11; if the space between the ends of the screws is opened or increased, the lever 14 will be enabled to rock on the fulcrum 15, independently of, and relatively to, the member 16, to an extent depending on the adjustment of said screws, but when the lever reaches the end of such independent swing, it will rock in unison with the member 16, about the axis 11.

Let us assume that the lever 14 is locked to the member 16 as shown in Fig. 1. Then, as the member 16 is carried about the axis A by the rotation of the driving member 11, the roller 13, traveling along the wavy groove 12 of the driven member 10 (the latter also being constrained to rotate about the axis A, without any side motion), will cause the lever 14 and member 16 to rock together about the axis of 11, the number of oscillations depending on the difference in speed (number of revolutions) between the driving member 11 and the driven member 10. These oscillations will impart a certain momentum to the weights 17, thus causing the roller 13 to exert a pressure on the walls of the groove 12, and thereby transferring energy to the driven member 10 in such a manner as to cause it to rotate about the axis A, in the same direction as the driving member 11. The speed of the driven member will be in proportion to the torque required to overcome the resistance which tends to keep the driven member from moving in the intended direction. Should this resistance be large enough to hold the member 10 stationary, the number of oscillations of the weights 17 and of the member 16 about the axis 11 (per revolution of the driving member about the axis A) will reach a maximum. If this number of oscillations should require more energy than the force which actuates the driving member is supplying, the result will be a slowing down of said driving member and a corresponding decrease of the torque exerted upon the driven member. In order to prevent such a slowing down of the driving member, the stops or screws 18 would be retracted so as to give the lever 14 some play relatively to the member 16, so that the action of the cam groove 12 on the lever 14 would cause the latter to swing in unison with the member 16 only during part of the throw of such lever. In other words, while the oscillations of lever 14 would remain of the same amplitude, those of the member 16 would be of a smaller amplitude than before, the lever having a certain amount of lost motion, on the fulcrum 15, relatively to the member 16. By retracting the stops 18 more and more, the amplitude of the oscillations of member 16 will be reduced correspondingly, with a like decrease in the speed of the driven member, until finally, with a certain distance between the stops 18, the lever 14 would rock on the fulcrum 15 without any rocking action on the member 16, and in this case the speed of the driven member would be reduced to a minimum. With this device, therefore, any desired amount of energy can be transmitted from the driving member to the driven member, at any speed desired within two limits, if the parts are made of proper strength and proportions to enable them to transmit the full energy of the source of power.

With a groove or cam such as shown at 12 in Fig. 1, the speed and torque will be varied as described. If, in addition thereto, it is desired to vary the power transmitted, the cam groove would have to be given a different shape, for instance, one of the character indicated at 12' in Fig. 2, where the individual waves of the groove are not alike, but alternately convex and concave.

In the example illustrated by Figs. 3 to 6, the principle explained above has been embodied as follows:

19 is the drive shaft, and 20 the driven shaft, said shafts being suitably supported in bearings (one of which is shown at 21) and represented as in axial alignment. These shafts are connected by the improved transmission, so that during continuous rotation of the driving shaft 19, the driven shaft may be allowed to remain stationary, or rotated at any speed up to a certain maximum. On the drive shaft 19 is secured rigidly a housing 22, and within this housing a weight or heavy disk 23 is mounted loosely on an extension or sleeve 24 rigid with said housing, said weight being free to turn relatively to the shaft, but held against any substantial longitudinal movement. A bushing 25 may line the central hole of the weight 23. At a distance from the axis said weight is connected by a universal joint 26, of any well-known or approved construction, with one end of a link 27, the other end of said link being connected by a universal joint 28 with a crank arm 29 on a rock shaft 30 journaled in bearings 31 secured to the housing 22, the axis of said rock shaft lying in a plane perpendicular to the axis of the drive shaft 19, the two axes being in skew relation to each other. By "skew relation" as used herein is meant that the two axes are neither parallel nor intersecting. I have shown the link 27 located partly within the weight 23, the latter having a chamber 23' in which the link has sufficient play, the joint 26 being located in the median plane of the weight, and the latter being made in two sections, as indicated in Figs. 3 and 6, for convenient assembly. While I prefer this particular balanced construction, I do not intend to be restricted thereto. The rock shaft 30 has a second crank arm 32, at an angle to the arm 29, and preferably arranged to move in a plane which is axial with respect to the shaft 19, and perpendicular to the shaft 30, see Fig. 4.

The free end of the crank arm 32 is connected pivotally at 33 with a link 34, extending lengthwise of the shaft 19 through a suitable aperture 22' in the housing 22, and the other end of said link has a pivotal connection at 35 with a rocking member or ring 36 provided with aligning radial projections 37 by means of which it is supported in bearings 38 secured to the housing 22. As will be seen from Fig. 3, the axes of the projections 37 and of the pivotal connections 33, 35, are parallel to the axis of the rock shaft 30.

To the ring 36 is pivoted, by means of radial pins 39 the axis of which intersects at right angles the axis of the projections 37, a ring or race 40 which by reason of its peculiar action may be termed a wabble ring. Suitable rolling elements, such as radial tapering rollers 41, engage the runway of this ring or race 40, and also engage a similar annular conical runway in an opposing ring 42 which rotates with the driven shaft 20, but is normally in a fixed relation thereto (that is, normally shaft 20 and ring 42 rotate in unison, with no relative motion). As an example of a suitable connection between the parts 20, 42, I have shown the following: The shaft 20 is made with a longitudinal slot so as to form two spaced portions 20' (Fig. 5) between which is fitted a central extension 42' integral or rigid with the ring 42, a transverse radial pivot 43 connecting these parts, so that they will be compelled to rotate together as the shaft 20 rotates, yet there is a possibility of swinging the ring 42, relatively to the shaft 20, about the pivot axis 43. To hold the ring 42 normally in a definite position relatively to the shaft 20, yet allow such position to be changed, the following adjusting mechanism has been shown: The ring 42 has an extension 44 connected pivotally at 45 with a link 46 having a similar connection at 47 with a projection 48 on a ring 49. The axes of 43, 45, and 47 are parallel. The ring 49 is adjustable lengthwise of the shaft 20, for instance by being mounted to turn (on ball bearings 50) within a grooved portion of a sleeve 51 which is normally stationary, but may be shifted lengthwise of the shaft 20. As an example, I have shown the sleeve 51 in the nature of a nut screwing on a threaded portion 21' of the bearing 21 and provided with spokes (handles) 52 or the like for turning such sleeve to effect the desired longitudinal adjustment of the sleeve 51. Both shafts 19 and 20 are journaled in their bearings in any usual or approved manner, without any substantial longitudinal play.

In the particular position illustrated by Fig. 3, the ring 42 is in such a position that the axis of its conical runway coincides with that of the shaft 20, and therefore the axes of the rollers 41 lie in a plane perpendicular to the axis of said shaft. Therefore, as the shaft 19 rotates, it will simply take along the weight 23 and the link mechanism connecting such weight with the ring 36 and wabble ring 40. In this particular case, the ring 40 will simply rotate about the axis of the shaft 20, without any wabbling motion, and no longitudinal motion will be imparted to the link 34. The rollers 41 will travel on the runway of the ring 42, which will remain stationary, so that in this particular position no motion will be transmitted from the shaft 19 to the shaft 20. Now let us assume that by turning the sleeve 51, the operator adjusts the ring 42 to a position in which its axis will no longer coincide with that of the shaft 20. The runway of the ring 42 then has an inclined position, as it were, and the plane which contains the axes of the rollers 41 (and of the pins 39) will no longer be perpendicular to the axis of the shaft 20, but oblique thereto. It will be obvious that under these changed conditions rotation of the ring 36 will be accompanied by a rocking motion thereof about the axis of the pins 37, which motion will be shared by the race 40, the latter also having an additional rocking motion about the axis of the pins 39, that is, the ring 40 will have a wabbling motion. The rocking of the ring or rocker 36 about the axis of the pins 37 will cause a longitudinal motion of the link 34 and through the medium of the rock shaft 30 and link 27, oscillate the weight 23, as it were, relatively to the drive shaft 19. In other words, since the weight rotates with said shaft, the weight will be accelerated and retarded periodically. The energy thus produced will react on the inclined ring 42, and the pressure exerted against said ring by the rollers 41 as the ring 36 is rocked, has a component that will cause the ring 42, and with it the shaft 20, to rotate in the same direction as the drive shaft 19. The velocity or number of revolutions of the driven shaft will increase as the angle between the axis of ring 42 and the axis of shaft 20 is increased. A powerful torque will be obtained at low speeds as well as at high speeds, and the change of speed will be as gradual as the adjustment of the sleeve 51.

The construction shown is very simple and compact, and highly efficient to transmit either constant or varying horse-power from the driving shaft to the driven shaft at varying rates of speed, and with a powerful torque.

It will be noted that I accelerate and retard periodically the rotary member constituted by the weight 23; in addition thereto, and simultaneousely therewith, I also accelerate and retard the reciprocating or oscillating motion (lengthwise of the shaft) of the reciprocating member formed by the link 34, as well as of the parts 30, 36, and 40 connected with said link. The acceleration and retardation of both motions operates to effect the transmission of power.

Various modifications may be made without departing from the nature of my invention as set forth in the appended claims.

I claim:

1. Power-transmitting mechanism comprising a rotary driving member, an oscillating member held to rotate with said driving member and mounted to oscillate relatively thereto about the axis of rotation of said driving member, a driven member, an operative connection from said oscillating member to said driven member, such connection including an adjusting device for controlling the oscillations of said oscillating member, and for varying the effect of said oscillations on the driven member.

2. Power-transmitting mechanism comprising a rotary driving member, an intermediate member mounted for oscillation about the axis of said driving member to share the rotation of said driving member but in addition is movable relatively thereto alternately in opposite directions, a driven member, an operative connection from said intermediate member to said driven member, such connection including means controlling the extent of the oscillation of said intermediate member relatively to the driving member, and an adjusting device for controlling said means on the driven member.

3. Power-transmitting mechanism comprising a driving member, an intermediate member which shares the motion of said driving member but in addition has an oscillating periodic motion relatively thereto, a driven member, an operative connection from said intermediate member to said driven member, such connection including means controlling the motion of said intermediate member relatively to said driving member, and an adjusting device for controlling said means and for varying the effect of said periodic motion on the driven member.

4. Power-transmitting mechanism comprising a rotary driving member, a housing held to rotate with said member, a rock shaft journaled in said housing to swing about an axis in skew relation to the axis of said driving member, an intermediate member mounted to oscillate about the axis of said driving member, a connection between said rock shaft and said intermediate member to cause the latter to rotate with the driving member yet oscillate relatively thereto whenever said rock shaft swings relatively to the housing, a driven member, and a connection from said rock shaft to said driven member to produce an oscillating motion of said rock shaft and intermediate member and also to produce rotation of the driven member by utilizing the momentum gathered by the intermediate member during such oscillating motion and adjustable means for changing, while the mechanism is in motion, the amplitude of the oscillations producing such acceleration and retardation.

5. Power-transmitting mechanism comprising a rotary driving member, a rotary driven member, and an operative connection between said members, said connection including an intermediate rotary member mounted to rotate about the axis of said driving member, a member having a straight line reciprocation connected to said intermediate member, and means for accelerating and retarding such reciprocating member and intermediate member and adjustable means for changing, while the mechanism is in motion, the amplitude of the oscillations producing such acceleration and retardation.

6. Power-transmitting mechanism comprising a rotary driving member, an intermediate member having an inertia mass which shares the rotary motion of said driving member but in addition has a periodic motion relatively to, and about the axis of, said member, a rotary driven member, a member held to rotate with the driven member but adjustable to different angles relatively thereto, means for adjusting the last-mentioned member, and an operative connection between said last-mentioned member and the said intermediate member.

7. Power-transmitting mechanism comprising a rotary driving member, an intermediate member having an inertia mass which shares the rotation of said driving member but in addition is adapted to oscillate relatively thereto about the axis of rotation of said driving member, a rotary driven member, a member held to rotate with said driven member and pivoted thereto about a transverse axis, so that it may assume different positions, means for adjusting the said pivoted member about such transverse axis, and an operative connection between said pivoted member and said intermediate member.

In testimony whereof I have hereunto set my hand.

GUSTAVE BLUEMEL.